United States Patent
Arganbright

[15] 3,697,613
[45] Oct. 10, 1972

[54] DISMUTATION OF OLEFINS
[72] Inventor: Robert P. Arganbright, Houston, Tex.
[73] Assignee: Petro-Tex Chemical Corporation, Houston, Tex.
[22] Filed: April 28, 1969
[21] Appl. No.: 819,945

[52] U.S. Cl.................260/683 D, 252/463, 252/465
[51] Int. Cl...............................................C07c 3/62
[58] Field of Search............260/683 D; 252/463, 465

[56] References Cited

UNITED STATES PATENTS

| | | | |
|---|---|---|---|
| 3,438,888 | 4/1969 | Spurlock | 208/139 |
| 3,546,311 | 12/1970 | Heckelsberg | 260/683 |
| 2,939,837 | 7/1960 | Berger | 252/465 |
| 3,424,811 | 1/1969 | Mango | 260/680 |
| 3,457,320 | 7/1969 | Stapp et al. | 260/683 |

FOREIGN PATENTS OR APPLICATIONS 1,106,016  3/1968  Great Britain.............260/683

*Primary Examiner*—Delbert E. Gantz
*Assistant Examiner*—C. E. Spresser
*Attorney*—G. Baxter Dunaway

[57] ABSTRACT

Isobutylene and a second $C_3$–$C_{20}$ monoolefin can be reacted (dismutation) over an alumina supported catalyst of the oxide of molybdenum, tungsten or rhenium modified with fluoride ion in the form of a soluble salt in a weight ratio of fluoride ion to metal oxide in the range of 0.065:1 to 0.20:1 to produce different olefinic product than the starting olefins. For example, isobutylene is reacted with 2-butene over a $MoO_3$, NaF ($F^-$:$MoO_3$ ratio 0.175:1) at 150° C. to give 30 percent conversion of isobutylene aNd 15 percent selectivity to 2-methyl-2-butene which is the immediate precursor of isoprene (widely used in the preparation of synthetic rubber).

25 Claims, No Drawings

DISMUTATION OF OLEFINS

BACKGROUND OF THE INVENTION

The reaction of olefinic molecules in the presence of metal containing catalysts to produce an equal number of other olefinic molecules, e.g. propylene passed over a molybdenum-alumina catalyst to yield as the principal products ethylene and butenes by the reaction

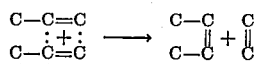

is often referred to as "disproportionation" and can be attributed to Robert L. Banks and Grant C. Bailey, I & EC Product Research and Development, Vol. 3, No. 3, Sept., 1964, pp. 170–173. The term "dismutation" has also been employed to describe this reaction and is the term used herein to describe the reaction of olefinic molecules to produce an equal number of other olefinic molecules.

In addition to reaction of a single molecule type as described by Banks and Bailey, there has been considerable interest in a variation of this process wherein two dissimilar olefin molecules are reacted to form two molecules of a different single olefin, e.g. ethylene and 2-butene react to form propylene. This variation is shown in Netherlands Pat. application 6,514,985 of British Petroleum Company, Limited, published May 20, 1966.

Dismutation of olefinic materials offers a new vista of synthesis of valuable olefin monomers from less valuable olefin monomers. The present invention is directed to a process for the dismutation of 2-methyl-1-propene (isobutylene) and an acyclic olefin having two to 20 carbon atoms. Prior to the present invention the reaction of isobutylene has been very difficult because of the competing oligomerization of the isobutylene.

DESCRIPTION OF THE INVENTION

It has now been found that the dismutation of isobutylene and a $C_3$ to $C_{20}$ acyclic olefin can be carried out over certain prior art dismutation catalysts which have been treated with a fluoride salt. Briefly stated, the present invention is a process for the reaction of 2-methyl-1-propene and an acyclic monoolefin comprising contacting 2-methyl-1-propene and an acyclic monoolefin having three to 20 carbon atoms in the presence of a catalytic composition selected from the group consisting of molybdenum oxide, tungsten oxide and rhenium oxide on a support of at least 75 percent alumina said catalyst incorporating fluoride ion in a weight ratio of fluoride ion to molybdenum oxide, tungsten oxide or rhenium oxide present in a range of about 0.065:1 to 0.20:1 at a dismutation temperature in the range of 20°–400° C.

REACTANTS

Suitable acyclic monoolefins include, for example, propene, 2-methyl-1-propene, 1-butene, 2-butene, 1-pentene, 2-pentene, 3-hexene, 4-methyl-1-heptene, 2-decene, 6-dodecene, 3-tetradecene, 10-cicosene and the like. A preferred class of monoolefins has up to 10 carbon atoms and a still more preferred class would have up to six carbon atoms.

One embodiment of the present invention relates to the preparation of 2-methyl-2-butene from 2-methyl-1-propene and 2-butene. In this embodiment the reaction can be represented as:

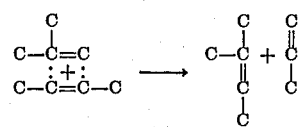

2-Methyl-2-butene is of value as the immediate precursor of isoprene which is obtained by the oxydehydrogenation of 2-methyl-2-butene. Isoprene is of value in the preparation of synthetic rubbers. The other product of this reaction is propene which polymerizes alone to polypropylene or with other olefin monomers such as ethylene to produce ethylene-propylene copolymers which have wide usefulness such as films, fibers and coatings.

In addition to the utilities for 2-methyl-2-butene and propene listed above, the olefinic products for the most part, have established utility as precursors of polymers. The olefinic products are hydrated by conventional means to produce polyhydric alcohols which are employed in the preparation of polyurethanes and polyesters, formed by the condensation, respectively, of polyisocyanates such as toluene diisocyanate and polybasic acids such as terephthalic acid with the polyols so produced.

CATALYSTS

The catalyst employed in the process of the invention comprises a catalyst support, an oxide of molybdenum, tungsten or rhenium modified by the inclusion therein of fluoride ion in the form of the soluble salts thereof. The active catalyst composition component comprises the oxide in a high positive oxidation state, e.g. hexavalent molybdenum or tungsten or heptavalent rhenium. When the catalyst is employed in some other form, pretreatment is customarily employed to convert the molybdenum, tungsten or rhenium to the form of the oxide. The proportion of molybdenum, tungsten or rhenium oxide can be varied, generally from about 2.0 to 30 weight percent, with the more preferable proportion being in the range of 5 to 20 weight percent calculated as the metal oxide on the support.

The composition of the catalyst support is also of importance in obtaining suitable reaction selectivities. Suitable supports comprise at least a major proportion of alumina with no more than minor proportions of other components, specifically a suitable catalyst support contains at least 75 weight percent alumina, preferably 95 weight percent alumina with the remainder being made of essentially inert materials, such as silica or magnesia which do not substantially promote undesirable side reactions.

The essential feature of the invention process is the incorporation of fluoride ion into the alumina supported, oxide of molybdenum, tungsten or rhenium catalyst. The fluoride ion is incorporated on a weight ratio of fluoride ion to catalyst metal oxide (molybdenum, tungsten or rhenium oxide) in the range of 0.065:1 to 0.20:1. The complete function of the fluoride ion is not known; however, the effect on the present reaction can be observed. At weight ratios of fluoride to catalyst metal oxide below about 0.065:1 the fluoride has little or no effect and oligomerization predominates to the exclusion of the desired dismutation. As the weight ratio of fluoride ion to catalyst metal increases beyond 0.20:1 the activity of the catalyst is sharply curtailed. At a weight ratio of fluoride ion to catalyst metal of 0.26:1 the catalyst is completely deactivated and no reaction is observed. Although the present invention is not limited to any mechanism, it would appear that fluoride ion is a poison to the catalyst compositions employed. In any event it is essential that the concentration of fluoride ion be in about the range specified in order to obtain the beneficial results of the process. The usefulness of other halide ions in the same manner as fluoride has been investigated. The other halides are also poisons for the present catalyst compositions but to such an extent that even trace amounts of such other halides deactivate the catalyst.

The fluoride ion is usually present on the catalyst compositions in the form of a soluble salt thereof. Some suitable salts are sodium fluoride, cadmium fluoride, zinc fluoride, potassium fluoride, and the like.

The preparation of the supported catalyst compositions is effected by conventional techniques of dry-mixing, coprecipitation, impregnation, ion exchange and the like. The catalyst compositions components are introduced in one operation or in separate stages. Although the order in which the various components are added to the support is not critical, it is preferred to add the fluoride salt subsequently to the other catalyst components. It is the usual practice to pretreat or activate the catalyst composition prior to utilization in the process. The precise method of pretreatment employed will depend to some extent on the nature and form of the catalyst components. In general, however, the pretreatment comprises heating an initially prepared support catalyst in an atmosphere of non-reducing gas such as nitrogen, argon, carbon monoxide or oxygen containing gas. One function served by the pretreatment is to convert the catalyst into the form of the oxides if these components were not initially provided as oxides. For example, initial catalyst components such as ammonium molybdate, ammonium meta-tungstate, ammonium perrhenate and the like are converted to corresponding oxides by heating in a non-reducing atmosphere.

It is desirable that at least a major proportion of the catalyst components initially be present in the highest oxidation state possible and, if not, the desired elevation of positive oxidation is effected by pretreatment in the presence of oxygen, alone or in mixtures with other gases. Regardless of the initial form of the catalyst components, the formed catalyst should be maintained at elevated temperatures for a time. The pretreatment temperature is not critical and is typically in the range of 300°–750° C. Pretreatment times typically range from 1 to 12 hours. Subsequent to pretreatment, the supported catalyst composition is usually flushed with inert gas to remove residual traces of oxygen or adsorbed water and returned to room or reaction temperature in an oxygen free atmosphere. The finished catalyst is employed in any conventional form such as powder, flakes, spheres, pellets, or the like.

REACTION CONDITIONS

The reaction is conducted by contacting isobutylene and acyclic monoolefin with the supported, modified catalyst at a dismutation temperature in the range of room temperature, about 20° C. to about 400° C. This temperature range covers the operational ranges for the three catalyst metal oxides which although performing in the same manner have somewhat different operational ranges. The rhenium oxide catalyst composition operates at about 20°–80° C., preferably 25°–50 C. The molybdenum oxide compositions operate advantageously in a range of about 75° to 150° C. or more preferably 80°–100° C. The tungsten oxide compositions require high temperatures and function at around 250°–400° C., more preferably 300°–350° C. The process is typically carried out at from atmospheric to superatmospheric pressures. Suitable pressures are in the range of 1 – 150 atmospheres, preferably up to 70 atmospheres.

The reaction is conveniently carried out as a continuous process in a tubular reactor wherein the catalyst is maintained in a fixed or fluidized bed. Alternatively, a batch type operation can be employed by agitating the olefin reactants and catalyst together in a suitable reactor such as an autoclave. In the continuous process a convenient method of measuring olefin addition is in terms of weight hourly space velocity (WHSV) which measures the weight of olefin which contacts unit weight of catalyst composition per hour and is in units of reciprocal hours ($hr^{-1}$). It is convenient in the instant process to add the isobutylene and $C_3$–$C_{20}$ olefin to the reactor at constant pressure, for example, to 1,500 p.s.i., at a WHSV typically in the range of 0.01 $hr^{-1}$ to 0.10 $hr^{-1}$, the isobutylene and $C_3$–$C_{20}$ olefin being added continuously.

The reaction products can be recovered by conventional means, such as fractional condensation, fractional distillation or the like.

The following examples are present to further illustrate the invention:

EXAMPLE 1.

Preparation of $MoO_3$-alumina catalyst

A $MoO_3$-alumina catalyst was prepared by impregnating dry commercial alumina ⅛ inch pellets (Alcoa H-151) with sufficient ammonium molybdate hydrate (in solution) to provide 10 weight percent of molybdenum oxide ($MoO_3$) on the support. The impregnated alumina was heated to 550° C. for about 2 hours under a flow of air. The catalyst was then cooled to room temperature and placed under nitrogen.

EXAMPLE 2.

Preparation of $Re_2O_7$-alumina catalyst

A rhenium oxide catalyst was prepared by impregnating dry commercial ⅛ inch alumina pellets with sufficient ammonium perrhenate (in solution) to provide 20 weight percent rhenium oxide ($Re_2O_7$) on the support. The impregnated alumina was heated for about 2 – 3 hours at 550° C. The catalyst was cooled to room temperature and placed under nitrogen.

EXAMPLE 3.

Preparation of Halide Modified Catalyst

Halide modified catalysts were prepared by impregnating the catalyst indicated in the Table I below with the solution indicated. After about 1 hour the catalyst was dried at 110° C. The modified catalyst was then placed in a tubular reactor and heated at 550° C. for 1 hour.

TABLE I

| Run | Catalyst | Wt. % Metal Oxide On Support | Halide Salt | Conc. Of* Salt Wt. % | Wt. Ratio Halide Ion: Metal Oxide |
|-----|----------|------|------|-----|-------|
| A | $MoO_3$ | 10 | NaF | 4 | 0.18 |
| B | $MoO_3$ | 10 | KF | 4 | 0.13 |
| C | $MoO_3$ | 10 | $CdF_2$ | 4 | 0.10 |
| D | $MoO_3$ | 10 | $ZnF_2$ | 4 | 0.146 |
| E | $Re_2O_7$ | 20 | NaF | 4 | 0.086 |
| F | $MoO_3$ | 10 | KF | 2 | 0.065 |
| G | $MoO_3$ | 10 | KF | 8 | 0.26 |
| H | $MoO_3$ | 10 | NaCl | 2 | 0.12 |

*Aqueous.

EXAMPLES 4 –

Dismutation of Isobutylene and 2-Butene

These examples present a series of runs using as the feed isobutylene and 2-butene over the catalysts previously described. The reactions were carried out in vertical glass tubular reactors through a fixed bed of catalyst. The reactor effluent was analyzed by gas-liquid phase chromotograph (GLPC) to determine the weight percent isobutylene converted and the weight percent of 2-methyl-2-butene in the product. The reaction conditions and yields are set out in Table II.

TABLE II

| Example | Catalyst | | | Conditions | | | Results | |
|---|---|---|---|---|---|---|---|---|
| | type | metal oxide wt. % | sup-port | wt. ratio F⁻: metal oxide | whsv hr⁻¹ | re-action temp. °C | pres-sure psi | (1) Conver-sion of iso-buty-lene % | 2-methyl 2-bu-tene selec-tivity % |
| 4 | $MoO_3$ | 10 | alumina | 0 | .8 | 95 | 14.7 | 90 | 0 |
| 5 | $MoO_3$, | 10 | " | .175 | .05 | 150 | " | 30 | 15 |
| 6 | $MoO_3$, | 10 | " | .13 | .05 | 95 | " | 51 | 20 |
| 7 | $MoO_3$, | 10 | 37 | .10 | .05 | 95 | " | 60 | 2 |
| 8 | $MoO_3$, | 10 | 37 | .146 | .05 | 95 | 37 | 60 | 1 |
| 9 | $Re_2O_7$ | 20 | " | 0 | .25 | 32 | " | 5 | 0 |
| 10 | $Re_2O_7$, NaF | 20 | " | .086 | .02 | 38 | " | 24 | 58 |
| 11 | $MoO_3$, KF | 10 | " | .065 | .05 | 95–150 | " | 90 | <1 |
| 12 | $MoO_3$, | 10 | " | .26 | .05 | 95–260 | " | 0 | 0 |
| 13 | $MoO_3$, NaCl | 10 | 37 | .12 | .05 | 95–250 | " | 0 | 0 |

(1) GLPC, based on weight of isobutylene in feed.
(2) GLPC, based on isobutylene, % by weight.

The invention claimed is:

1. A process for the reaction of 2-methyl-1-propene and an acyclic monoolefin having three to 20 carbon atoms comprising contacting 2-methyl-1-propene and an acyclic monoolefin having three to 20 carbon atoms in the presence of a catalytic composition selected from the group consisting of molybdenum oxide, tungsten oxide and rhenium oxide on a support of at least 75 percent alumina, said catalyst incorporating fluoride ion in a weight ratio of fluoride ion to molybdenum oxide, tungsten oxide or rhenium oxide in a range of about 0.065:1 to 0.20:1 at a dismutation temperature in the range of 20° to 400° C.

2. The process according to claim 1 wherein the support is at least 95 percent alumina.

3. The process according to claim 2 wherein the catalyst composition is molybdenum oxide.

4. The process according to claim 3 wherein the temperature is in the range of 125° to 150° C.

5. The process according to claim 4 wherein the temperature is in the range of 80° to 100° C.

6. The process according to claim 4 wherein the acyclic monoolefin has up to 10 carbon atoms.

7. The process according to claim 6 wherein the acyclic monoolefin has up to six carbon atoms.

8. The process according to claim 7 wherein the acyclic monoolefin is 2-butene.

9. The process according to claim 2 wherein the catalyst composition is tungsten oxide.

10. The process according to claim 9 wherein the temperature is in the range of 250° to 400° C.

11. The process according to claim 10 wherein the temperature is in the range of 300° to 350° C.

12. The process according to claim 10 wherein the acyclic monoolefin has up to 10 carbon atoms.

13. The process according to claim 12 wherein the acyclic monoolefin has up to six carbon atoms.

14. The process according to claim 13 wherein the acyclic monoolefin is 2-butene.

15. The process according to claim 2 wherein the catalyst composition is rhenium oxide.

16. The process according to claim 15 wherein the temperature is in the range of 20° to 80° C.

17. The process according to claim 16 wherein the temperature is in the range of 25° to 50° C.

18. The process according to claim 16 wherein the acyclic monoolefin has up to 10 carbon atoms.

19. The process according to claim 18 wherein the acyclic monoolefin has up to six carbon atoms.

20. The process according to claim 20 wherein the acyclic monoolefin is 2-butene.

21. A process for the preparation of 2-methyl-2-butene comprising contacting 2-methyl-1-propene and 2-butene in the presence of a catalytic composition selected from the group consisting of molybdenum oxide, tungsten oxide and rhenium oxide on a support of at least 75 percent alumina, said catalyst incorporating fluoride ion in a weight ratio of fluoride ion to molybdenum oxide, tungsten or rhenium oxide in a range of about 0.065:1 to 0.20:1 at a dismutation temperature in the range of 20° to 400° C.

22. The process according to claim 21 wherein the support is at least 95 percent alumina.

23. The process according to claim 22 wherein the catalyst composition is molybdenum oxide.

24. The process according to claim 22 wherein the catalyst composition is tungsten oxide.

25. The process according to claim 22 wherein the catalyst composition is rhenium oxide.

* * * * *

PO-1050
(5/69)

UNITED STATES PATENT OFFICE
CERTIFICATE OF CORRECTION

Patent No. 3,697,613      Dated October 10, 1972

Inventor(s) Robert P. Arganbright

It is certified that error appears in the above-identified patent and that said Letters Patent are hereby corrected as shown below:

In the Abstract of the Disclosure line 10 should be "and".

Column 5, line 27, reads "4- " but should read "4-13".

Column 4, line 12, reads "25°-50C" but should read "25°-50°C".

Column 5, Table I, lines 14 and 15 read "   Salt" but should read "Halide Salt".

Column 5, Table II, line 49 reads "$MoO_3$" but should read "$MoO_3$, NaF".

Column 5, Table II, line 50 reads "$MoO_3$" but should read "$MoO_3$, KF".

Column 5, Table II, line 51 reads "$MoO_3$" but should read "$MoO_3$, $CdF_2$".

Column 5, Table II, line 52 reads "$MoO_3$" but should read "$MoO_3$, $ZnF_2$".

Column 5, Table II, line 56 reads "$MoO_3$" but should read "$MoO_3$, KF".

Column 5, Table II, lines 51, 52, and 57 read "37" but should read " " (ditto marks)".

Column 6, line 46 reads "claim 20" but should read "claim 19".

Signed and sealed this 1st day of May 1973.

(SEAL)
Attest:

EDWARD M. FLETCHER, JR.
Attesting Officer

ROBERT GOTTSCHALK
Commissioner of Patents